(12) United States Patent  
Blot-Lefevre (10) Patent No.: US 9,391,775 B2  
(45) Date of Patent: Jul. 12, 2016

(54) SIGNATURE METHOD AND DEVICE (75) Inventor: Eric Blot-Lefevre, Neuilly-sur-Seine (FR)

(73) Assignee: TrustSeed SAS, Galluis (FR)

( * ) Notice: Subject to any disclaimer, the term of this patent is extended or adjusted under 35 U.S.C. 154(b) by 997 days.

(21) Appl. No.: 12/867,998

(22) PCT Filed: Jan. 5, 2009

(86) PCT No.: PCT/EP2009/050037  
§ 371 (c)(1),  
(2), (4) Date: Dec. 21, 2010

(87) PCT Pub. No.: WO2009/087128  
PCT Pub. Date: Jul. 16, 2009

(65) Prior Publication Data  
US 2011/0093713 A1   Apr. 21, 2011

(30) Foreign Application Priority Data  
Jan. 7, 2008  (FR) ..................................... 08 00078

(51) Int. Cl.  
*H04L 9/32*     (2006.01)

(52) U.S. Cl.  
CPC .............. *H04L 9/321* (2013.01); *H04L 9/3247* (2013.01); *H04L 9/3297* (2013.01); *H04L 2209/76* (2013.01)

(58) Field of Classification Search  
CPC ............................. H04L 9/321; H04L 9/3247  
See application file for complete search history.

(56) References Cited

U.S. PATENT DOCUMENTS 6,327,656 B2 * 12/2001 Zabetian ........................ 713/176  
6,567,913 B1 *  5/2003 Ryan, Jr. ....................... 713/156  
(Continued)

FOREIGN PATENT DOCUMENTS

JP   H 11-88321    3/1999  
JP   2001-134179   5/2001  
(Continued)

OTHER PUBLICATIONS

Menezes, Vanstone, Oorschot: "Handbook of Applied Cryptography" 1997, CRC Press LLC, USA, XP002489380—pp. 4, 11-13, 22-23, 28-30, 399-400, 548-549, 556, 559-560, 581-583.

(Continued)

*Primary Examiner* — Brandon Hoffman  
(74) *Attorney, Agent, or Firm* — Stroock & Stroock & Lavan LLP (57) ABSTRACT

A method for signing a document to be transmitted between two correspondents, i.e. a sender and an addressee, including recording the sender and the addressee of the document for the allocation of a digital identity thereto; authorizing by the addressee a correspondence with the sender; ciphering the document; indicating to the addressee that the document is available; detecting an access to the document by the addressee; generating an electronic report indicating the delivery of the document, the document-delivery electronic report including a set of data associated with the transmission of the document to the addressee, the set including identification of elements concerning the addressee authentication, the sealing of the document, the access to the document by the addressee and the time-stamping of the access to the document by the addressee; and electronically signing, by a reliable third-party using the private key thereof, the document-delivery electronic report.

12 Claims, 2 Drawing Sheets

(56) References Cited

U.S. PATENT DOCUMENTS

| | | | |
|---|---|---|---|
| 6,571,334 B1* | 5/2003 | Feldbau et al. | 713/170 |
| 7,370,206 B1* | 5/2008 | Goldman | 713/176 |
| 8,462,920 B2* | 6/2013 | Gonen et al. | 379/93.12 |
| 2003/0028495 A1* | 2/2003 | Pallante | 705/78 |
| 2007/0050840 A1* | 3/2007 | Grandcolas et al. | 726/5 |
| 2007/0078900 A1* | 4/2007 | Donahue | 707/200 |

FOREIGN PATENT DOCUMENTS

| | | |
|---|---|---|
| JP | 2002-182563 | 6/2002 |
| JP | 2004-240637 | 8/2004 |
| JP | 2004-240806 | 8/2004 |
| JP | 2011-521484 | 7/2011 |

OTHER PUBLICATIONS

Shi, Q et al.: "Signature-based approach to fair document exchange" IEE Proceedings: Communications, Institution of Electrical Engineers, GB, vol. 150, No. 1, Feb. 13, 2003, pp. 21-27, XP006019685.

Search Report, mailed on Mar. 3, 2009, for PCT/EP2009/050037, filed on Jan. 5, 2009.

Office Action from Japanese Patent Application No. 2013-243047, mailed on Jun. 30, 2015.

* cited by examiner

SIGNATURE METHOD AND DEVICE

CROSS-REFERENCE TO PRIOR APPLICATIONS

This application is the U.S. National Phase application under 35 U.S.C. §371 of International Application No. PCT/EP2009/050037, filed on Jan. 5, 2009, and claims benefit to French Patent Application No. 0800078, filed on Jan. 7, 2008, both of which are incorporated by reference herein. The International Application was published on Jul. 16, 2009 as WO 2009/087128.

FIELD

The present invention relates to a signature method and device. It applies in particular to the exchanges of messages or documents between persons linked together by a telecommunication network.

BACKGROUND

With respect to the legal signature on a dematerialized document, the regulations stipulate that, when the signature is digital, and failing any "electronic signature" validated by an approved Certification Authority, it includes the use of a reliable method for strong personal identification guaranteeing its link with the deed to which it is attached.

It will be reminded that the electronic signature is an instrument governed by law. It is a cryptographic method associated with a digital identity certificate that belongs exclusively to its owner, that is to say to the signatory. The secure electronic signature typically conforms to three principles.

The first relates to the security of the personal identification of the signatory. The electronic signature contains the digital identity certificate of its owner. The certificate has been issued by an enrolment or registration office which is responsible for establishing the digital identity certificate according to the legal status and trust attributes of the registered person. The probative value of the certificate is checked by the Certification Authority which creates the digital certificate and which assigns it to its owner when the owner has supplied supporting papers for establishing his identity, his domicile, his nationality, his telephone details, etc.

The second principle typically governing the electronic signature relates to the integrity of the document. The electronic signature establishes the seal on the content which is mandatorily attached to the document. This content is, where appropriate, encrypted. The signature "guarantees with the deed to which it is attached a link such that any subsequent modification of the deed can be detected".

The third principle typically governing the electronic signature concerns the uniqueness of the electronic signature method. The signature instrument is retained by the signatory "under his exclusive control". The signature "is specific to the signatory". It is therefore impossible to lend it without being in breach of the law.

The conversion of the handwritten signature on a paper document into an electronic signature on a digital document therefore uses two associated means which are, on the one hand, means for identifying the signatory, the digital certificate revealing his identity and indicating the reference of the registration office and of the Certification Authority that are behind its issue and its publication in a directory and, on the other hand, a cryptography method within the meaning of the law that can be used to encrypt the content of the document.

The duly signed digital document makes it possible to establish the probative value of a number of elements:

the identity of the signing person,
the expression of his will when he activates the signature for a document or for an action concerning this document, such as sending and receiving this document,
the link between the expression of the will and the content of the deed or of the document,
the content of the document or the meaning of the action performed, and
the guarantee of integrity of the document or of the meaning of the action performed.

However, it may be that the signatory does not want to install an electronic signature on his workstation.

SUMMARY

According to an embodiment, the present invention provides a method for signing a document to be transmitted between two correspondents, a sender and a recipient, including:

a step for registering the sender and the recipient of this document to assign them a digital identity,
a step for authorizing, by the recipient, correspondence with the sender,
a step for encrypting the document,
a step for notifying the recipient that the document is available,
a step for detecting access to the document, by the recipient,
a step for constructing an electronic document delivery report, the electronic document delivery report including a set of data associated with the transmission of the document to the recipient, the set including identifications of elements concerning authentication of the recipient, sealing of the document, access by the recipient to the document and time-stamping of the access by the recipient to the document, and
a step for the electronic signing by a trusted third party, with his own private key, of the electronic document delivery report.

By virtue of the implementation of the present invention, it is possible to produce a legal signature of a digital document, upon its reception, without recourse to the electronic signature.

According to embodiments of the present invention, the method that is a subject of the present invention, as succinctly explained hereinabove, also include:

a step for notifying the sender that the document is ready to be sent,
a step for detecting a validation of the document, by the sender,
a step for constructing an electronic sending report, the electronic document sending report including a set of data associated with the transmission of the document by the sender, the set including identifications of elements concerning authentication of the sender, sealing of the document, validation of the document by the sender and time-stamping of the validation of the document by the sender, and
a step for the electronic signing, by the trusted third party, with his own private key, of the electronic sending report.

By virtue of these arrangements, it is possible to produce a legal signature of a digital document, when it is sent, without recourse to the electronic signature.

According to embodiments of the present invention, the method that is the subject of the present invention, as succinctly explained hereinabove, also includes a step for the strong identification of at least one correspondent.

According to embodiments of the present invention, the step for the strong identification of the correspondent and/or the step for detecting a choice of the correspondent includes the sending, to a telephone, of a single-usage code and a step for entry, by the correspondent, of this code, on a computer terminal different from the telephone.

According to embodiments of the present invention, during the encryption step, the document is encrypted by a correspondence operator with his own electronic signature.

According to embodiments of the present invention, the document sent to the recipient includes a PDF file, a signature and a signature certificate.

According to embodiments of the present invention, the method that is the subject of the present invention, as succinctly explained hereinabove, includes a step for time-stamping the choice made by each correspondent during the choice detection step.

According to embodiments of the present invention, during the step for detection of a choice, a selection of an explicit message by the correspondent is detected, by implementing a pointing device.

According to embodiments of the present invention, during the step for constructing a report, the report includes links between the following data:
- the digital identity of the correspondent,
- the reference to the certificate used to sign the document,
- the encrypted digital document,
- the reference to the appointed operator,
- the reference to the electronic signature of the appointed operator,
- the time-stamp for the choice made by the correspondent,
- the reference to the time-stamping authority, and
- the meaning of an action performed.

According to embodiments of the present invention, during the step for constructing a report, the report also includes a link with a rating of the digital identity of the correspondent.

According to embodiments of the present invention, the method that is the subject of the present invention, as succinctly explained hereinabove, includes a step for archiving the legal signature established by each report.

According to an alternate embodiment, the present invention includes a device for signing a document to be transmitted between two correspondents, a sender and a recipient, including:
- means of registering the sender and the recipient of this document to assign them a digital identity,
- means for authorizing, by the recipient, correspondence with the sender,
- means for encrypting the document,
- means for notifying the recipient that the document is available,
- means for detecting an access to the document, by the recipient,
- means for constructing an electronic document delivery report, the electronic document delivery report including a set of data associated with the transmission of the document to the recipient, the set including identifications of elements concerning authentication of the recipient, sealing of the document, access by the recipient to the document and time-stamping of the access by the recipient to the document, and
- means for the electronic signing by a trusted third party, with his own private key, of the electronic document delivery report.

Since the features of this device are similar to those of the method that is the subject of the present invention, as succinctly explained hereinabove, they are not reviewed here.

BRIEF DESCRIPTION OF THE DRAWINGS

Other advantages, aims and characteristics of the present invention will emerge from the following description, given for explanatory purposes and in a nonlimiting manner in light of the appended drawings, in which.

DETAILED DESCRIPTION

The description below refers, for each document, only to a single sender and a single recipient. However, the present invention is not limited to this configuration but extends, on the contrary, to the case where a number of senders preferably validates a document before it is sent and/or the case where a number of recipients of the document are provided.

Before describing particular embodiments, in light of the figures, a general description of the invention is given hereinbelow. First of all, it will be reminded that the legal signature on a dematerialized document includes the use of a reliable method of strong personal identification guaranteeing its link with the deed to which it is attached. This strong identification is accomplished by a trusted third party tasked with the initial personal registration of the legal status and personal telephone details. Registration also includes acceptance of a universal correspondence agreement with probative legal value in which the person subscribing to the document transmission service consents to entrust the sealing of his electronic correspondence documents to a document service provider, called "document correspondence operator", who is not the neutral trusted third party.

Thus, failing any electronic signature held by the person signing a document, or in the case of invalidation of his electronic signature for which the digital identity certificate is not validated (or is revoked) by its initial issuing authority, the Certification Authority, the legal signature process includes having the trusted third party proceed with a strong identification via a loop, or a cycle, for secure transmission of a secret, and then in checking the validity of the correspondence agreement bearing the sealing proxy with respect to an appointed operator, and finally in checking that the appointed operator has indeed sealed the document before archiving it in an electronic safe with probative value.

Finally, the trusted third party establishes, independently of the operator, a time-stamp and a validating click confirmation embodying or representing the will to apply a meaningful legal signature for the document affected by the electronic correspondence. The electronic signature applies equally for the document sent and for the "notice of reception", a separate document created upon receipt of the document by the recipient.

For the validity of the digital legal signature, failing the use of a valid "electronic signature", both for the need of the sender concerning his document (correspondence file) and for the recipient (reception acknowledgement file), a succession of electronic proofs is preferably combined in a computerized way:
- identification of the person and measurement of the probative force of this identity which is preferably greater than 3 (with respect to the rating of the digital identity, see the patent application PCT/EP2009/050037 incorporated herein by reference);

check on the existence of a universal correspondence agreement signed by the person;

check that the signed universal correspondence agreement includes a valid sealing proxy to a document correspondence operator still affiliated to the trusted third party network of the trusted third party;

proof of delivery to the trusted third party of the seal of the document and its placement in an electronic safe with probative value by and on the premises of the operator;

time-stamping, by the trusted third party, of the document with its proof of sealing, and notification to the signatory, by electronic mail and by the trusted third party:
  a. that the signatory has been strongly identified, which corresponds to the probative value level,
  b. that the document has been sealed and archived by the signatory's operator, using references, and
  c. that the whole has been time-stamped and registered to require its legal signature embodied by a click on the secure interface.

Upon the click expressing a legal signature, the trusted third party compiles a report signed with its own trusted third party electronic signature to officially recognize the conformity of the document sending or reception procedure.

The electronic report includes a set of data associated with the transmission of the document by the sender or to the recipient, the set including identifications of elements concerning authentication of the sender or of the recipient, sealing of the document, supply of the document by the sender or access to the document by the recipient, and time-stamping of the supply of the document or of the access to the document by the recipient to the document.

This report is retained in the correspondence office made available to the signatory by the trusted third party (for the sender and for the recipient). This report is sent to the operator who is, upon receipt of the report, authorized to move correspondence (that is to say, either send the document or send the reception acknowledgement) between the two parties to the current correspondence accounts mandatorily opened by the two corresponding parties in the books of the operator. On the basis of this movement of correspondence it is possible to initiate as derivative service, for example through the intermediary of management slips (slips associated with a document and defining a task likely to be carried out in relation to the document and the form to be used when carrying out this task, as explained in the patent application PCT/EP2009/050037 incorporated herein by reference), additional communication services by electronic mail ("email"), by electronic fax ("efax"), by AS2 or by desktop publishing (rematerialization: printing, placing in an envelope and sending by mail).

Figure 1:
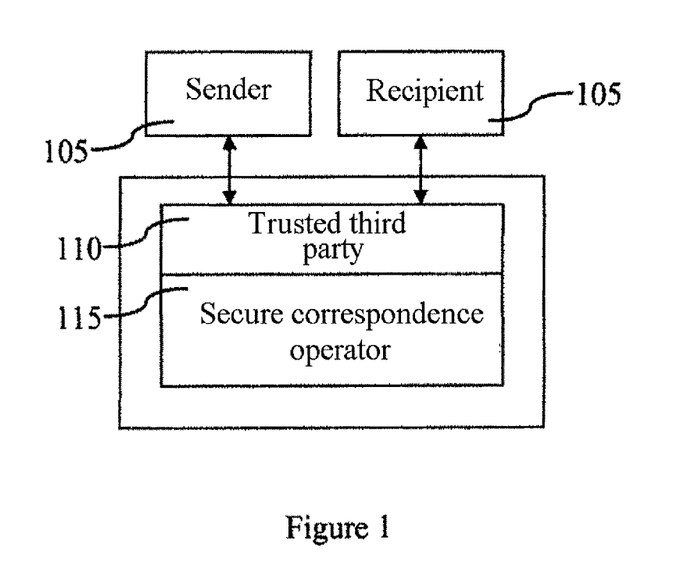
FIG. 1 diagrammatically represents elements of a device that is the subject of an embodiment of the present invention.

As will be seen in FIG. 1, to implement the legal signature that is the subject of embodiments of the present invention, it is preferable for the user 105 to enter into an agreement with a trusted third party 110 and/or with a secure correspondence operator 115, in order to use their document management services.

The main function of the trusted third party 110 is to register and check the digital identity of the users. The trusted third party 110 also handles the document sending or reception report, for each correspondent, with his correspondence operator 115 who composes, encrypts or seals the document. This is done in a neutral way since the trusted third party is independent of the parties present.

The correspondence operator 115, if necessary, performs all the operations involving composition, transmission and retention of the documents with their proofs of sending and of receipt.

It will be reminded here that a registered letter relating to the conclusion or the execution of a contract may be sent by electronic mail provided that this mail is routed via a third party according to a method that makes it possible to identify the third party, to designate the sender, to guarantee the identity of the recipient, and to establish whether the letter has been delivered or not to the recipient.

Figure 2:
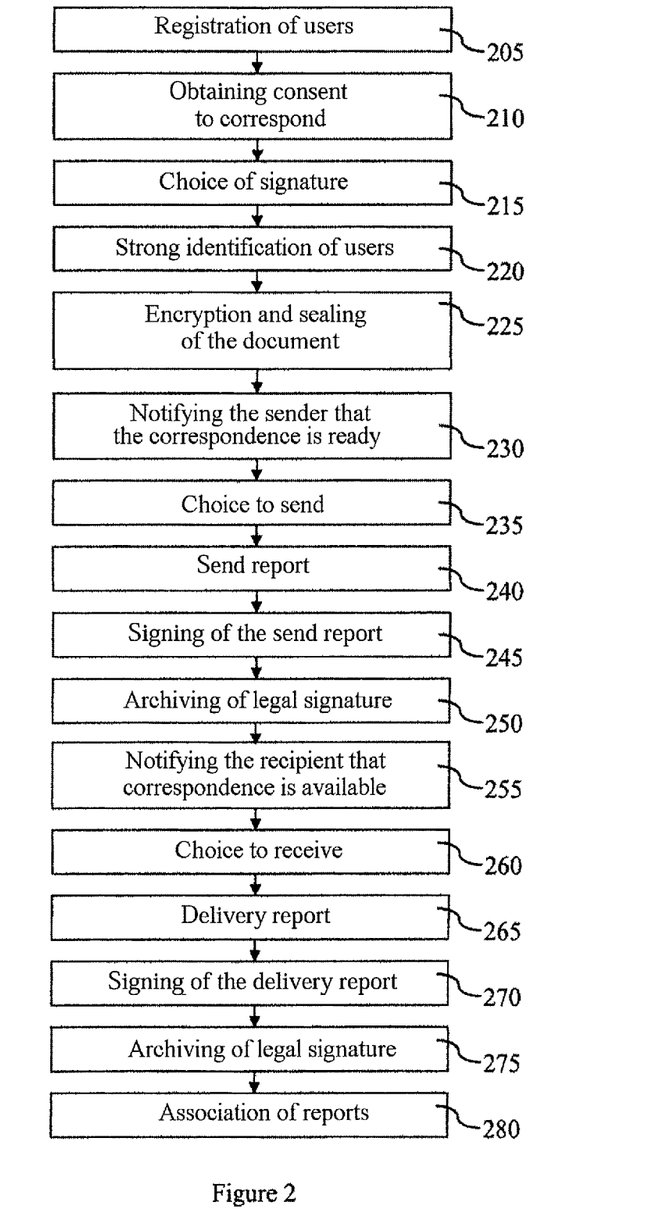
FIG. 2 is a flow diagram representing the steps implemented in a particular embodiment of the method that is the subject of the present invention.

The method that is the subject of embodiments of the present invention includes, for the trusted third party ("TDC") and for the document correspondence operator ("OCD"), in carrying out the following operations, illustrated in FIG. 2 and described hereinbelow.

During a step 205, each party to a correspondence is registered to use their digital identity with a certain probative value. During this step 205, the trusted third party proceeds with the strong identification of the person, as explained with regard to the step 220, hereinbelow.

During a step 210, the trusted third party obtains the consent from the recipient to correspond with the sender if the latter has not already been registered. The trusted third party therefore proposes, to each new correspondent (who receives an "email" notification of the availability of a mail that has arrived with the operator, regarding the recipient), registration (legal status/digital identity) to accept and sign a "correspondence agreement with probative value" equivalent to an agreement of proof which protects him. This procedure, launched by the trusted third party, is called "acceptance". It is scheduled at the request of the sending correspondent.

During a step 215, the trusted third party offers the recipient, in the "correspondence agreement with probative value", the choice between an electronic signature ("SE") installed on the workstation (for example, via USB key (USB being an acronym for "Universal Serial Bus", in other words implementing the USB protocol) and a signature by electronic report ("SPPVE"). As will be seen hereinbelow, the signature by electronic report includes transposing the legal signature by combining two elements: the "strong identification" of the remotely-connected correspondent, and the "encryption" of the correspondence document.

During a step 220, the user is strongly identified. In one embodiment, the procedure for authenticating the user is a strong identification handled by the trusted third party ("TDC"). The latter addresses a short message, or SMS (acronym for "Short Message System") containing a single-usage encrypted secret code, to the user's cell phone, this user having to reenter it, within the next 20 seconds, on the computer interface of the trusted third party in order to prove his identity after the user name ("login") and a static password have been verified. The encrypted secret code is a sequence of seven digits or letters, the combination of which is calculated according to the numerical code of the original certificate (legal registration number) assigned to this correspondent. Preferably, this code also depends on the content of the document, on the identity of at least one of the correspondents, on the time-stamp and on a random number.

During a step 225, the document is encrypted and sealed. The document encryption is entrusted, by proxy, to the document correspondence operator ("OCD"). The acceptance of the correspondence agreement indicates the name of the appointed document correspondence operator. Each document is encrypted by the document correspondence operator with its own electronic signature (private key), the digital identity certificate of which is, par excellence, valid or verified on the revocation directory made available to the public by the secure Certification Authority on which it depends.

During a step 230, the sender or signatory is notified, by an electronic mail ("email") sent by the trusted third party, that his correspondence is ready for him to validate his document before giving his consent to send it. This transmittal document (letter or text file from the sender) includes a PDF file, a seal and a signature certificate.

During a step 235, the choice of the sender is detected and processed. A management action is performed at the level of the trusted third party. It is symbolized by one or two "clicks", that is to say a selection with a pointing device, for example a computer mouse, of a displayed area representing his agreement (for example a text such as "I accept"). One or two clicks may also signify that the correspondence is cancelled or rejected, depending on the position identified by the pointing device (for example, on a text such as "I reject"). The click/double click is observed by the trusted third party and a specific time-stamp is assigned to it. As a variant, it is the input, on a terminal different from the telephone, of a code transmitted by short message (SMS) as explained with regard to the step 220, which is considered as the expression of the will of the sender to validate the document and transmit this document.

During a step 240, an electronic document send report ("PVE") is completed. The electronic document send report includes a set of data associated with the transmission of the document by the sender, the set including identifications of elements concerning authentication of the sender, sealing of the document, validation of the document by the sender and time-stamping of the validation of the document by the sender. Thus, it is the trusted third party who reconstructs, in his report, the "links" necessary for the legal signing of the document, between the following data:

qualified digital identity of the sender,
    a link with a rating of the digital identity of the sender,
    the reference to the certificate used to sign the document,
    the rating of the digital identity of the sender,
    the encrypted digital document,
    the reference to the appointed document correspondence operator,
    the reference to the electronic signature of the document correspondence operator,
    the time-stamp of the management click,
    the reference to the time-stamping authority and/or
    the meaning of the action performed.

During a step 245, the trusted third party signs the electronic send report, with his own private key, the sender's signature report, which combines, in a structured file, the rated identity of the sender, the encrypted document and the time-stamped action performed.

During a step 250, the trusted third party archives the legal signature established by the send report. The trusted third party has a log summarizing all the electronic reports. Each legal signature report concerning a correspondent, for its sending or its reception, mentions, in order to formalize the legal signature confirmed by the trusted third party, the identifier or the reference number of the correspondent, the number of his accepted correspondence agreement, the reference of the operator appointed to encrypt, the reference of the electronic signature and the Certification Authority specific to the operator. The log of the signatures by electronic report ("SPPVE") is deposited in an electronic safe by encrypting it with the public key of the trusted third party.

During a step 255, the trusted third party notifies the recipient, by electronic mail (email), that a correspondence is available for his attention; this is the reception acknowledgement document.

During a step 260, the trusted third party detects and processes the choice of the recipient in a way similar to that detailed with regard to the step 235. The click/double click is thus confirmed by the trusted third party and it is assigned a specific time-stamp by invoking a time-stamping authority. As a variant, it is the input, on a terminal different from the telephone, of a secret code transmitted by short message (SMS) as explained with regard to the steps 220 and 235, which is considered as the expression of the will of the recipient to access the document.

During a step 265, the trusted third party completes an electronic document delivery report ("PVE"). The electronic document delivery report includes a set of data associated with the transmission of the document to the recipient, the set including identifications of elements concerning authentication of the recipient, sealing of the document, access by the recipient to the document and time-stamping of the access by the recipient to the document. Thus, it is the trusted third party who reconstructs, in his report, the "links" necessary to the legal signing of the document, between the following data:

the qualified digital identity of the recipient,
    a link with a rating of the digital identity of the recipient,
    the reference to the certificate used to sign the document,
    the rating of the digital identity of the recipient,
    the encrypted digital document,
    the reference to the operator appointed by the recipient,
    the reference to the electronic signature of this operator,
    the time-stamp of the management click,
    the reference to the time-stamping authority and/or
    the meaning of the action performed.

During a step 270, the trusted third party signs, with his own private key, the electronic report ("PVE") of delivery of the document to the recipient, which combines in a structured file the rated identity of the recipient, the encrypted document and the time-stamped action performed.

During a step 275, the trusted third party archives the legal signature established by the document delivery report as explained with regard to the step 250.

During a step 280, the document send and delivery reports are associated in memory, in a manner that is known per se. This association is strong and includes an official number of the document and the name of the trusted third party.

The table below summarizes various steps implemented in particular embodiments of the method that is the subject of the present invention.

| Subscriber Correspondent Signatory | Trusted third party | Document correspondence operator |
|---|---|---|
| 1. Preliminary registration of sender (or recipient) | Legal status registration office Digital identity certificate Rating of the digital identity Choice of signature: Electronic signature or signature by electronic report (SPPVE) | |
| 2. Spontaneous subscription or invitation | Subscription to the document correspondence | |

| Subscriber Correspondent Signatory | Trusted third party | Document correspondence operator |
|---|---|---|
| concerning the recipient notified of receipt of mail | agreement Mention of the appointed operator Choice of services provided Proxy option entrusted to the operator appointed to encrypt or seal the invitee's documents sent and received. | |
| 3. Strong personal authentication | Personal identification by login and password + SMS encrypted secret code | |
| 4. Sealing for integrity of document sent or reception acknowledgement returned | | Document sealing action by the operator who uses his private electronic signature key |
| 5. Notification of the document for transmittal or reception | Email sent to authenticated sender/ recipient in order to embody his action performed in a meaningful "click": transmittal request/reception acknowledgement | |
| 6. Electronic report | Established by trusted third party by combining the proofs of strong authentication (ID), sealing of the document with the electronic signature of the operator, time-stamping of the management or validation click to send (or receive) the document | |
| 7. Electronic signing of the report | Use by the trusted third party of his private electronic signature key, the validity of which has previously been checked with its Certification Authority | |
| 8. Electronic archiving with probative value of electronic reports | Placing in electronic safe of daily log of signatures by electronic reports | |
| 9. Territoriality option National operator archiving | Transfer of conformal copy to operator with whom the legal proofs of the correspondent domiciled in his country are deposited | Encryption of the conformal copy for the correspondent's named safe and transmittal of certificate of deposition with trusted third party to confirm that national archiving has been done. |
| 10. Territoriality option Printing/routing | Transmittal of secure data to national operator | Printing and routing of proof of signature by electronic report Summarizing the information stored in the signature log of the trusted third party |

The different roles of the correspondence trusted third party (TCC) and of the document correspondence operator ("OCD") can be seen. The correspondence trusted third party is a neutral body which handles the functions required to register the identity of the people with their legal status and their correspondence objects. It guarantees the secrecy or the confidentiality of these trust attributes and of the correspondence objects which are exclusively employed in the scheduling of the correspondence tasks entrusted to one or more document management operators. It schedules the document management work flow by checking, on each operation, that the operator appointed for a document task correctly carries out his work by delivering, on completion of this operation, the proofs or the "revision path" between his contribution and the proof. The trusted third party is also responsible for the coordination and the interoperability of the exchanges between the operators involved or mobilized in a document processing chain with probative value. The trusted third party establishes, for the two corresponding parties, a document transmission and reception report to authenticate the legal signature of each person accepting responsibility for validating and sending, or for validating and receiving, an electronic document. The send or delivery report contains the proofs of the dematerialized legal signature of the signatory and the time-stamp of the click signifying his agreement or his consent to validate and correspond with the other party for the document concerned. Finally, the trusted third party handles the "transfer" of each original document which passes through it to be moved from one safe to another, between two remote archiving third parties which are affiliated to the trusted third party network and which, to this end, use a quite specific and secure trusted third party protocol.

The document correspondence operator executes the scheduling tasks that are entrusted to him by the trusted third party according to the mandate filed for him on registration of each correspondent posting his correspondence objects. His tasks are as follows:

composition of simple or structured file,
origination of the document in two parts: two conformal certified "originals",
if the sender has used an electronic signature, verification of the certificate,
protection of the document with a sealing option proxied to the operator,
retention of the document with its proofs or a summary list of them by archiving with probative value in each named electronic safe,
message switching: bilateral transmission in duplicate into current correspondence accounts for reading and downloading in collaborative secure mode, document exemplification: printing in a number of copies, placement in envelope and routing of conformal hard copies, transposition of the structured file or of its mandatory mentions into a single digital copy. This is a transfer of the original or a univocal automatic read of the mandatory legal mentions of the file, and a return of the supporting reception acknowledgement signed and returned to the sender (AS2, AS 400, or similar communication protocol).

These tasks are scheduled by the trusted third party with respect to one or more operators appointed by the sender. For each task, the trusted third party makes available the information that is needed: identity, rating of the personal identity, telephone details, mail addresses, rules established by the bilateral correspondence agreements, other regulatory provisions, graphics charter, reference form, document management mandates designating the operators involved, sealing proxy entrusted to an operator, choice of legal and electronic signature, references of the management work flow with the operators involved, etc.

It will be noted that the trusted third party checks each service provided to give a certificate of conformity and consigns the operation to its "revision path" (audit track) before launching the scheduling of the next service.

The present invention is not limited to the embodiments described herein, reference should be had to the appended claims.

The invention claimed is:

1. A computing system for managing legal signatures of electronic documents, the computing system comprising:
   a processor coupled to a memory device, the processor and memory device configured to implement:
   a module for recording by a trusted third party of digital identities of users of said system and of electronic-correspondence conventions whereby said users mandate a documentary correspondence operator to administer a proof of legal signature;
   a module for on-line strong authentication by said trusted third party of the digital identity of a user, wherein said strong authentication is provided by real-time validation by the trusted third party of a one-time password received by the user on a second terminal on a second network, and entered by said user in a first terminal connected to a first network;
   a module for sending by the user of a validation signal for validating contents of an electronic document, the validation signal generated in response to the user providing in real-time of the one-time password received by the user on the second terminal on the second network and entered by the user on the first terminal connected to the first network; and
   a module for transmitting a confirmation signal by at least one of said correspondence operator and said trusted third party of said validation signal;
   wherein:
   the module for sending by the user of the validation signal comprises a sub-module for interpreting a command input by the user on the first terminal while the user visualizes the content of the electronic document in a non-modifiable format on said first terminal; and
   a record of the validation signal and the confirmation signal is sealed and stored by the computing system.

2. The system for managing legal signatures according to claim 1, wherein the module for recording ascribes a level of trust to the digital identity of a user and in that said system authorizes correspondence operations only between users whose digital identities are of a level of trust above a predetermined threshold.

3. The system for managing legal signatures according to claim 1, wherein the module for sending the validation signal comprises a sub-module for interpreting a command input by the user on the first terminal, connected to said system, where the user visualizes the content of said electronic document in a non-modifiable format.

4. The system for managing legal signatures according to claim 3, wherein the sending module comprises a sub-module for choosing by the user of addressees of an electronic document, a sub-module for validating digital identities of said addressees and a sub-module for notifying the user that the electronic document is ready to be forwarded to the addressees.

5. The system for managing legal signatures according to claim 1, wherein the module for confirmation comprises a sub-module for creating an electronic receipt of sending of an electronic document, said electronic receipt comprising a digital record of: the strong authentication of the user, of sealing of the document, and of time-stamped validation of the electronic document by the user.

6. The system for managing legal signatures according to claim 5, wherein the confirmation module comprises a sub-module for electronic signing with a private key by the trusted third party of an electronic receipt of sending.

7. The system for managing legal signatures according to claim 1, further comprising a module for managing delivery of an electronic document forwarded to an addressee.

8. The system for managing legal signatures according to claim 7, wherein the module for managing the delivery of an electronic document forwarded to an addressee comprises a sub-module for notifying said addressee of availability of said document and a sub-module for validating reading of contents of the document by the addressee.

9. The system for managing legal signatures according to claim 8, wherein the sub-module for validating the reading of the contents of the document by the addressee further comprises a sub-module for creating an electronic receipt of delivery of the electronic document to the addressee, said receipt comprising a digital record of strong authentication of the addressee and of a time-stamped validation of the reading of the electronic document by the addressee.

10. The system for managing legal signatures according to claim 9, wherein the sub-module for validating the reading of the contents of the document by the addressee further comprises a sub-module for electronic signing by the trusted third party with a private key of the electronic receipt of delivery of the document to the addressee.

11. A method for generating a legal signature for electronic documents comprising:
   a step of on-line strong authentication by a trusted third party of a digital identity of a user pre-recorded by said trusted third party, wherein said strong authentication is provided by real-time validation by the trusted third party of a one-time password received by the user on a second terminal on a second network, and entered by said user in a first terminal connected to a first network;
   a step of sending by said pre-recorded user of a signal for validating a content of an electronic document; and
   a step of confirmation by at least one of a correspondence operator and the trusted third party of said validation signal;
   wherein generating the validation signal comprises entering in real-time by the user of the one-time password received by the user on the second terminal on the second network and entered by the user on the first terminal connected to the first network; and sending by the pre-recorded user of the signal for validating the content of the electronic document comprises interpreting a command input by the user on the first terminal while the user visualizes the content of the electronic document in a non-modifiable format on the first terminal.

12. The method for generating a legal signature of electronic documents according to claim 11, further comprising, prior to the step of on-line strong authentication, a step of recording by the trusted third party of digital identities of users and of electronic-correspondence conventions whereby said users mandate a documentary correspondence operator to administer a proof of legal signature.

* * * * *